US012267314B2

(12) United States Patent
Nainar et al.

(10) Patent No.: US 12,267,314 B2
(45) Date of Patent: *Apr. 1, 2025

(54) SERVICE ASSURANCE VIA FEDERATION-BASED NETWORK DURING ROAMING

(71) Applicant: Cisco Technology, Inc., San Jose, CA (US)

(72) Inventors: Nagendra Kumar Nainar, Morrisville, NC (US); Robert E. Barton, Richmond (CA); Carlos M. Pignataro, Cary, NC (US); Jerome Henry, Pittsboro, NC (US); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,137

(22) Filed: Jan. 16, 2024

(65) Prior Publication Data
US 2024/0154947 A1 May 9, 2024

Related U.S. Application Data

(63) Continuation of application No. 17/445,295, filed on Aug. 17, 2021, now Pat. No. 11,924,190.

(51) Int. Cl.
*H04L 29/06* (2006.01)
*H04L 9/40* (2022.01)
(Continued)

(52) U.S. Cl.
CPC .......... *H04L 63/0815* (2013.01); *H04L 63/04* (2013.01); *H04L 63/20* (2013.01); *H04W 12/06* (2013.01); *H04W 36/0038* (2013.01)

(58) Field of Classification Search
None
See application file for complete search history.

(56) References Cited

U.S. PATENT DOCUMENTS 6,704,873 B1 * 3/2004 Underwood ............ H04L 67/10
709/249
10,511,573 B2 * 12/2019 Larson .................... H04L 63/10
(Continued)

OTHER PUBLICATIONS

Renjan, Arya et al. A Policy Based Framework for Privacy-Respecting Deep Packet Inspection of High Velocity Network Traffic. 2019 IEEE 5th Intl Conference on Big Data Security on Cloud (BigDataSecurity). https://ieeexplore.ieee.org/stamp/stamp.jsp?tp=& arnumber=8818977 (Year: 2019).*
(Continued)

*Primary Examiner* — Jeremiah L Avery
(74) *Attorney, Agent, or Firm* — Patterson + Sheridan, LLP

(57) ABSTRACT

Aspects of the disclosure include a method and associated network device. The method includes authenticating an identity of a user of a client device after the client device is associated with an access network provider. Authenticating the identity of the user comprises receiving, from an identity provider, a credential associated with the identity, and receiving, from the identity provider, information identifying a network-based service to be applied to network traffic with the client device. The method further includes establishing, using the credential and the received information, a secure connection between the access network provider and a service provider that is capable of providing the network-based service. The method further includes receiving network traffic from the service provider. Packets of the network traffic include an assurance value that enables the client device to determine that the network-based service is being provided by the service provider.

19 Claims, 6 Drawing Sheets

(51) Int. Cl.
*H04W 12/06* (2021.01)
*H04W 36/00* (2009.01)

(56) References Cited

U.S. PATENT DOCUMENTS

| | | | |
|---|---|---|---|
| 11,005,839 B1* | 5/2021 | Shahidzadeh | H04W 12/06 |
| 11,134,058 B1* | 9/2021 | Sole | G06F 21/552 |
| 11,641,361 B2* | 5/2023 | Innes | G06F 21/6218 726/4 |
| 11,770,706 B1* | 9/2023 | Lilley | H04L 63/0853 379/265.09 |
| 2017/0006113 A1* | 1/2017 | Singhal | H04L 67/141 |
| 2017/0126718 A1* | 5/2017 | Baradaran | H04L 63/0281 |
| 2019/0158353 A1* | 5/2019 | Johnson | G06F 16/95 |
| 2021/0044976 A1* | 2/2021 | Avetisov | G06F 21/64 |
| 2021/0073933 A1* | 3/2021 | Punnoose | H04L 63/083 |
| 2021/0136041 A1* | 5/2021 | Foxhoven | H04L 63/0876 |
| 2021/0297447 A1* | 9/2021 | Crabtree | H04L 63/1416 |
| 2021/0377210 A1* | 12/2021 | Singh | H04L 67/125 |
| 2023/0336592 A1* | 10/2023 | Narayanaswamy | H04L 63/0263 |

OTHER PUBLICATIONS

Hagan, Matthew et al. Peer Based Tracking using Multi-Tuple Indexing for Network Traffic Analysis and Malware Detection. 2018 16th Annual Conference on Privacy, Security and Trust (PST). https://ieeexplore.ieee.org/stamp/stamp.jsp?tp=&arnumber=8514165 (Year: 2018).*

Nassar, Mohamed et al. Secure Outsourcing of Network Flow Data Analysis. 2013 IEEE International Congress on Big Data. https://ieeexplore.ieee.org/stamp/stamp.jsp?tp=&arnumber=6597175 (Year: 2013).*

Liyanage, Madhusanka et al. Securing the control channel of software-defined mobile networks. Proceeding of IEEE International Symposium on a World of Wireless, Mobile and Multimedia Networks 2014. https://ieeexplore.ieee.org/stamp/stamp.jsp?tp=&arnumber=6918981 (Year: 2014).*

Holasova, Eva et al. Specific Anomaly Detection Method in Wireless Communication Networks. 2020 4th Cyber Security in Networking Conference (CSNet).https://ieeexplore.ieee.org/stamp/stamp.jsp?tp=&arnumber=9265533 (Year: 2020).*

Monshizadeh, Mehrnoosh et al. Cloudification and security implications of TaaS. 2015 World Symposium on Computer Networks and Information Security (WSCNIS). https://ieeexplore.ieee.org/stamp/stamp.jsp?tp=&arnumber=7368308 (Year: 2015).*

\* cited by examiner

SERVICE ASSURANCE VIA FEDERATION-BASED NETWORK DURING ROAMING

CROSS-REFERENCE TO RELATED APPLICATIONS

This application is a continuation of co-pending U.S. patent application Ser. No. 17/445,295 filed Aug. 17, 2021, which is related to U.S. patent application Ser. No. 17/249,644, filed Mar. 8, 2021. The aforementioned patent applications are herein incorporated by reference in their entirety.

TECHNICAL FIELD

Embodiments presented in this disclosure generally relate to wireless networking, and more specifically, to techniques for providing assurance of network-based services to client devices when roaming.

BACKGROUND

Consumers increasingly expect their computing devices to remain connected to network-based services, regardless of their location. However, cellular services such as 4G LTE and 5G may provide less than optimal connections for certain locations that are indoors, far from cell towers, and/or otherwise obstructed. Technologies such as the Wireless Broadband Alliance's (WBA) OpenRoaming™ use a federation-based framework to allow consumers to seamlessly roam onto Wi-Fi networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
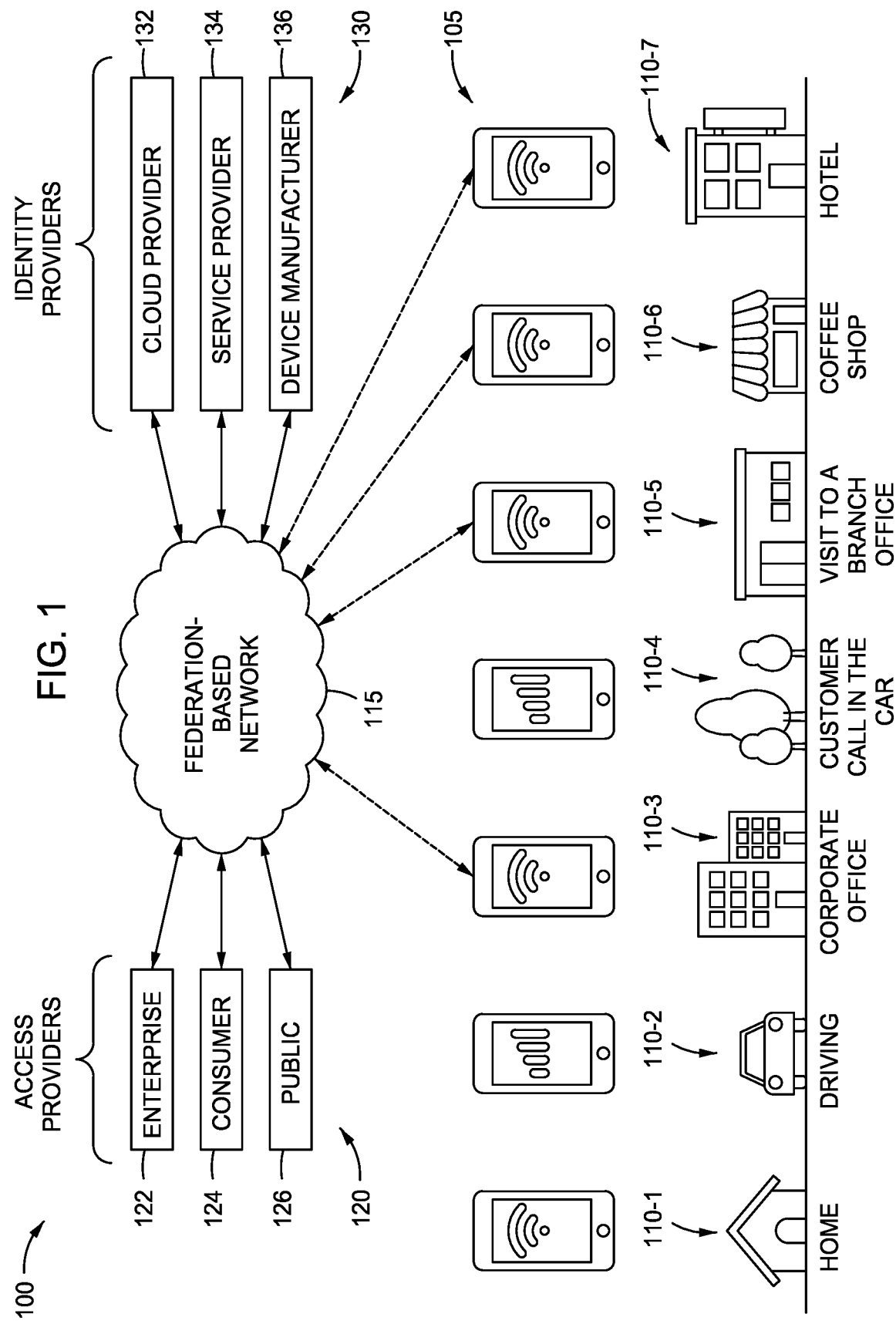
FIG. 1 is a diagram illustrating connection of a client device to a federation-based network while roaming, according to one or more embodiments.

One embodiment presented in this disclosure is a method comprising authenticating an identity of a user of a client device after the client device is associated with an access network provider. Authenticating the identity of the user comprises receiving, from an identity provider, a credential associated with the identity, and receiving, from the identity provider, information identifying a network-based service to be applied to network traffic with the client device. The method further comprises establishing, using the credential and the received information, a secure connection between the access network provider and a service provider that is capable of providing the network-based service. The method further comprises receiving network traffic from the service provider. Packets of the network traffic include an assurance value that enables the client device to determine that the network-based service is being provided by the service provider.

Another embodiment presented in this disclosure is a network device comprising one or more computer processors configured to perform an operation comprising authenticating an identity of a user of a client device after the client device is associated with an access network provider. Authenticating the identity of the user comprises receiving, from an identity provider, a credential associated with the identity, and receiving, from the identity provider, information identifying a network-based service to be applied to network traffic with the client device. The operation further comprises establishing, using the credential and the received information, a secure connection between the access network provider and a service provider that is capable of providing the network-based service. The operation further comprises receiving network traffic from the service provider. Packets of the network traffic include an assurance value that enables the client device to determine that the network-based service is being provided by the service provider.

Another embodiment presented in this disclosure is a method comprising associating a client device with an access network provider. Associating the client device comprises transmitting an identity of a user of the client device to the access network provider. The identity enables the access network provider to receive, from an identity provider, (i) a credential associated with the identity and (ii) information identifying a network-based service to be applied to network traffic with the client device. The method further comprises receiving, from a service provider that is capable of providing the network-based service, network traffic via a secure connection between the service provider and the access network provider. The secure connection is established using the credential and the received information. The method further comprises determining, based on the network traffic, whether the network-based service is being provided by the service provider.

EXAMPLE EMBODIMENTS

Technologies such as OpenRoaming™ permit client devices to roam to different access network providers without requiring repeated logins or authentications. Identity providers may seek to offer additional services beyond roaming, such as providing network-based (e.g., cloud-based) security services to the client devices.

In some embodiments described herein, a method comprises authenticating an identity of a user of a client device after the client device is associated with an access network provider. Authenticating the identity of the user comprises receiving, from an identity provider, a credential associated with the identity, and information identifying a network-based service to be applied to network traffic with the client device. The method further comprises establishing, using the credential and the received information, a secure connection between the access network provider and a service provider that is capable of providing the network-based service. The method further comprises receiving network traffic from the service provider. Packets of the network traffic include an assurance value that enables the client device to determine that the network-based service (e.g., a security service) is being provided by the service provider.

In other embodiments, the client device determines whether the network-based service is being provided by the service provider by establishing a separate channel from the client device to the service provider (via the access network provider), and transmitting characterization information of the network traffic via the separate channel. The client device receives a response from the service provider based on the characterization information, which indicates whether the network-based service is being provided by the service provider.

Beneficially, the method enables users to verify that network-based service(s) are being actively provided by the service provider to the network traffic with their client devices. This method addresses various difficulties, such as the access network provider being unable to successfully establish a secure connection using the credential from the identity provider, the secure connection being terminated during usage, and the access network provider spoofing the support for network-based service(s) to attract customers.

FIG. 1 is a diagram 100 illustrating connections of a client device 105 to a federation-based network 115 while roaming, according to one or more embodiments. The diagram 100 represents an example sequence of usage of a client device 105 by a user. For example, the sequence may represent a work trip of the user.

The client device 105 may be implemented in any form suitable for wireless networking. In some embodiments, the client device 105 is implemented as a mobile computing device, such as a laptop computer, a tablet, a smartphone, or a smart wearable device. In other embodiments, the client device 105 may be a computing device integrated into a vehicle.

At the beginning of the sequence, the user is at home 110-1 and the client device 105 is wirelessly connected to a home network (e.g., a Wi-Fi network) providing accessibility to an external network, such as a local area or local access network (LAN), a general wide area network (WAN), and/or a public network (e.g., the Internet). While the user is driving 110-2 a car, the client device 105 is wirelessly connected to a cellular network, such as a 4G LTE or 5G cellular network. When the user arrives at a corporate office 110-3, the client device 105 roams from the cellular network to a Wi-Fi network operated by the corporate office 110-3. The user returns to the car to conduct a customer call 110-4, and the client device 105 reconnects to the cellular network when out of range of the Wi-Fi network. The client device 105 later roams to different Wi-Fi networks when the user visits a branch office 110-5, a coffee shop 110-6, and a hotel 110-7.

When roaming to the different Wi-Fi networks (e.g., at the corporate office 110-3, the branch office 110-5, the coffee shop 110-6, and the hotel 110-7), the client device 105 uses a federation-based network 115 to access the external network. The federation-based network 115 may be implemented using any standardized and/or proprietary techniques and protocols. For example, the federation-based network 115 may be compliant with OpenRoaming™.

The federation-based network 115 comprises a plurality of access providers 120 (also referred to as "access network providers") providing wireless connectivity for the client device 105 using, e.g., access points, wireless LAN controllers, and so forth. Some non-limiting examples of the access providers 120 include enterprise access providers 122 (e.g., employers, manufacturing facilities), consumer access providers 124 (e.g., hotels, retailers), public access providers 126 (e.g., airports, universities, venues), and so forth.

The federation-based network 115 comprises a plurality of identity providers 130 that operate to create, maintain, and/or manage identity information for users and that provide authentication services within the federation-based network 115. Some non-limiting examples of the identity providers 130 include cloud providers 132 (e.g., vendors providing scalable computing resources), service providers 134 (e.g., telecommunications companies, utilities), and device manufacturers 136. By using the identity providers 130 to authenticate the user, the client device 105 may roam to the different access providers 120 without requiring repeated logins or authentications from the user.

Figure 2:
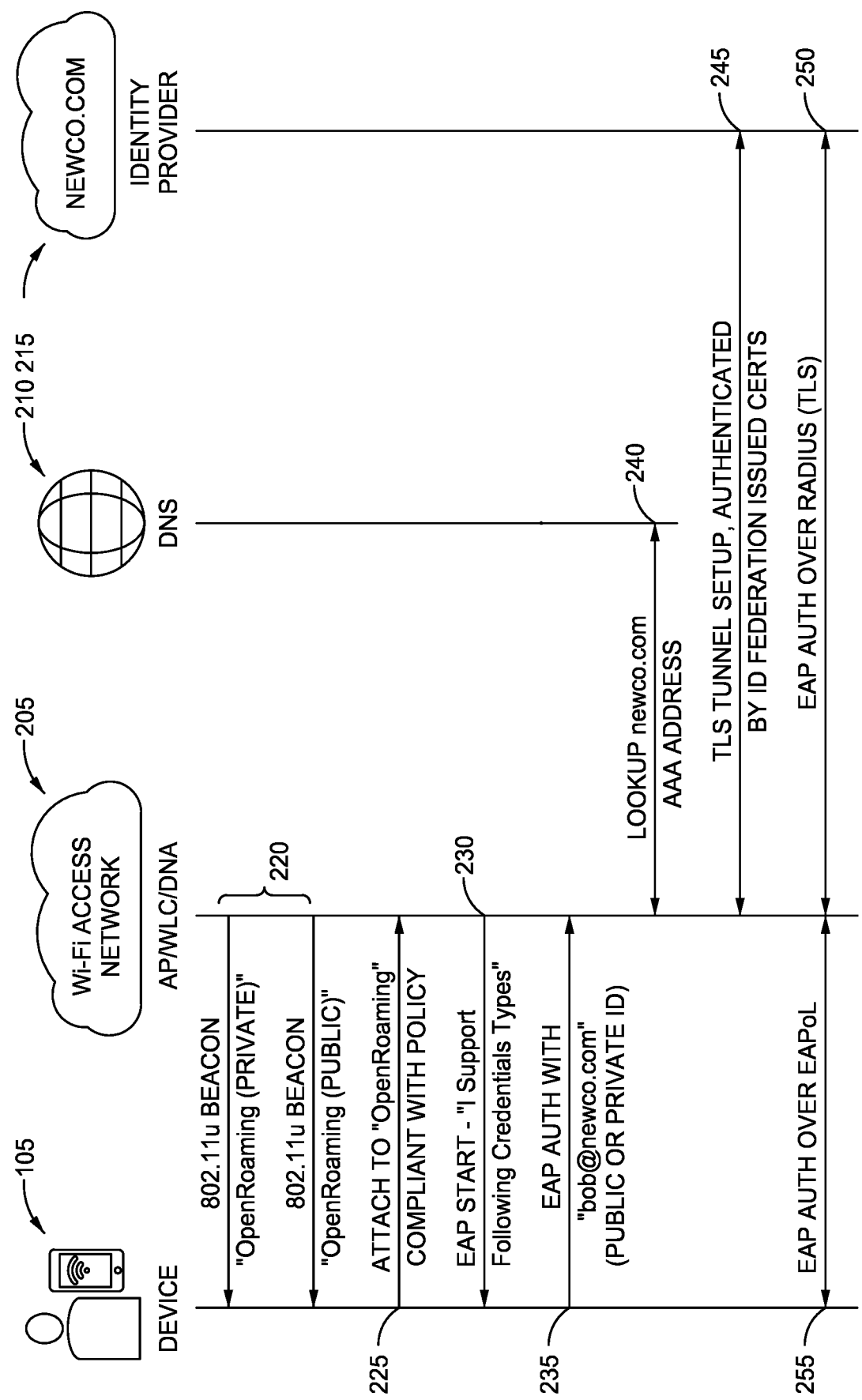
FIG. 2 is a diagram illustrating a sequence for connection of a client device to a federation-based network, according to one or more embodiments.

FIG. 2 is a diagram 200 illustrating a sequence for connection of a client device 105 to a federation-based network, according to one or more embodiments. The features illustrated in the diagram 200 may be used in conjunction with other embodiments, for example, illustrating connection of the client device 105 with an access provider 120 at any of the corporate office 110-3, the branch office 110-5, the coffee shop 110-6, or the hotel 110-7 illustrated in FIG. 1.

In the diagram 200, an access provider 205 (one example of the access providers 120 of FIG. 1) transmits a beacon 220 announcing one or more requirements for connecting the client device 105 to the access provider 205. The beacon 220 may be implemented in any suitable form, such as an IEEE 802.11u beacon. In some embodiments, the beacon 220 indicates that the client device 105 must provide a private identification for the user. In other embodiments, the beacon 220 indicates that the client device 105 must provide only a public identification.

The client device 105 attaches 225 to the access provider 205 responsive to the beacon 220 (that is, the client device 105 establishes a connection with the access provider 205), and the access provider 205 begins authentication of the user, e.g., via the Extensible Authentication Protocol (EAP) process, by communicating one or more acceptable credential types 230 to the client device 105. The client device 105 may search a list of profiles stored thereon and may automatically select an identity 235 corresponding to an acceptable credential type 230 (e.g., a token, certificate, username/password, SIM, etc.) and that best matches the one or more requirements that had been specified by the access provider 205 (e.g., via the beacon 220). In some embodiments, the identity 235 comprises elements of a Uniform Resource Locator (URL), such as a domain name. The client device 105 may select a best match using any suitable techniques.

The client device 105 provides the selected identity 235 to the access provider 205, and the access provider 205 contacts a Domain Name Service (DNS) server 210 using the identity 235. As shown in the diagram 200, the identity 235 selected by the client device 105 is "bob@newco.com", which may be a public identity or a private identity responsive on the beacon 220 transmitted by the access provider 205. The access provider 205 looks up 240 "newco.com" with the DNS server 210. Using the result from the DNS server 210, the access provider 205 sets up an encrypted and authenticated Transport Layer Security (TLS) tunnel 245 to an identity provider 215 (one example of the identity providers 130 of FIG. 1) corresponding to the selected identity 235. The identity provider 215 provides an EAP authorization 250 using Remote Authentication Dial In User Service (RADIUS) attributes to the access provider 205, and the access provider 205 provides an EAP authorization 255 to the client device 105 using EAP over LANs (EAPoL).

Figure 3:
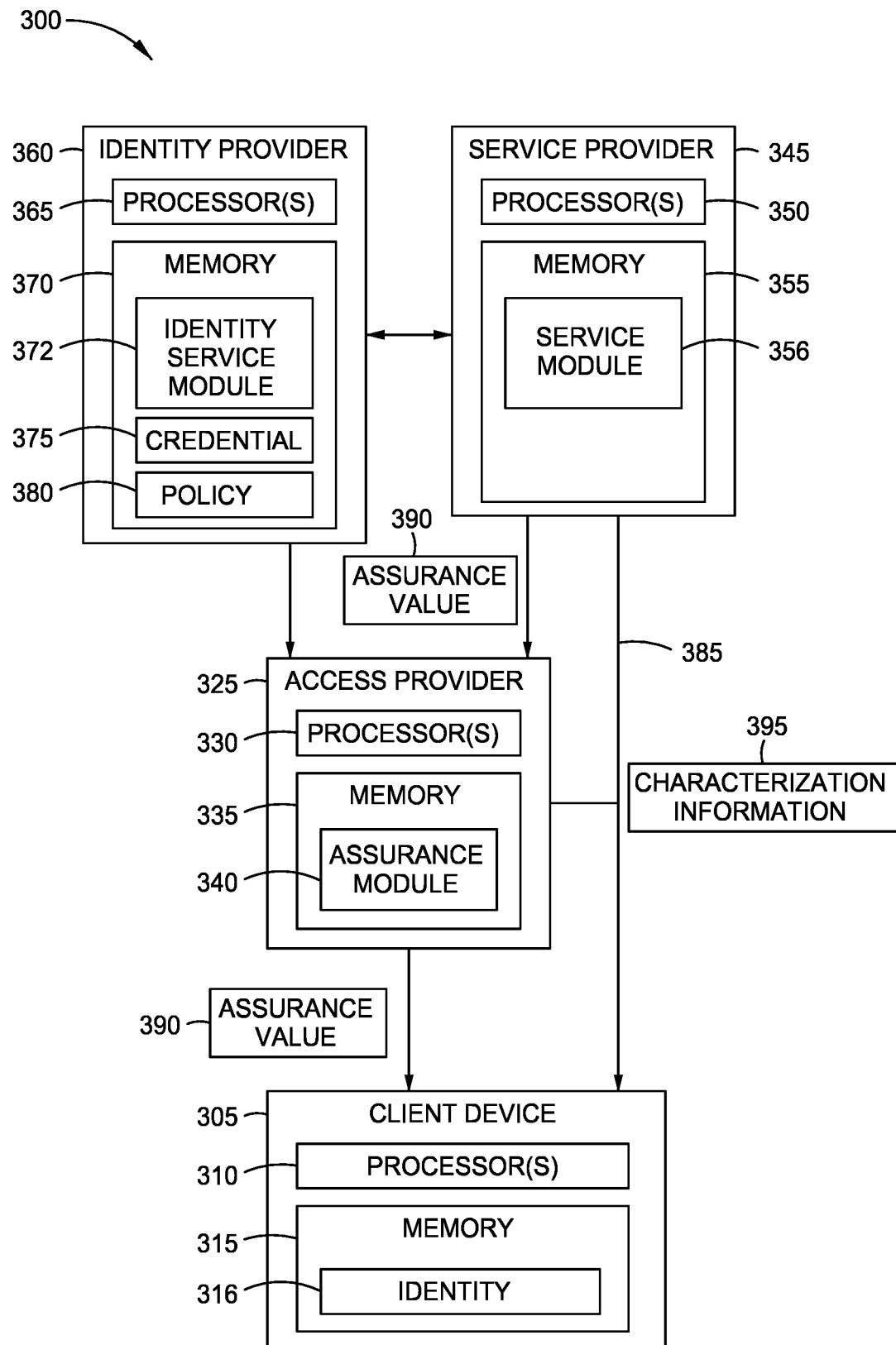
FIG. 3 is a diagram illustrating accessing a network-based security service, according to one or more embodiments.

FIG. 3 is a diagram 300 illustrating accessing a network-based service, according to one or more embodiments. The features illustrated in the diagram 300 may be used in conjunction with other embodiments. For example, the client device 305, the access provider 325, and the identity provider 360 of FIG. 3 may be respective examples of the client device 105, the access providers 120, and the identity providers 130 of FIG. 1.

In the diagram 300, the client device 305 connects to the access provider 325 via a wireless communicative link. The access provider 325, the identity provider 360 and a service provider 345 are interconnected using any suitable type(s) of communicative links. Each of the client device 305, the access provider 325, the identity provider 360, and the service provider 345 may be respectively implemented as one or more computing devices in any suitable form(s). For example, the client device 305 may be implemented as a mobile computing device of a user, while the access provider 325, the identity provider 360, and the service provider 345 may be implemented as server computers.

Each of the client device 305, the access provider 325, the identity provider 360, and the security service provider 345 comprises a respective one or more computer processors 310, 330, 365, 350 and a respective memory 315, 335, 370, 355. The one or more computer processors 310, 330, 365, 350 may be implemented in any suitable form, such as a general purpose microprocessor, a controller, an application-specific integrated circuit (ASIC), and so forth. The memory 315, 335, 370, 355 may include a variety of computer-readable media selected for their size, relative performance, or other capabilities: volatile and/or non-volatile media, removable and/or non-removable media, etc.

The interconnection of the access provider 325, the identity provider 360, and the service provider 345 may represent one example of the federation-based network 115 of FIG. 1, and may represent one or more networks of any suitable types, such as the Internet, a local area network (LAN), a wide area network (WAN), and/or a wireless network. The various communicative links between the access provider 325, the identity provider 360, and the service provider 345 may have any suitable implementation, such as copper transmission cable(s), optical transmission fiber(s), wireless transmission, router(s), firewall(s), switch(es), gateway computer(s), and/or edge server(s).

The memory 315, 335, 355, 370 may include one or more modules for performing various functions described herein. In one embodiment, each module includes program code that is executable by the one or more computer processors 310, 330, 350, 365. In another embodiment, each module is partially or fully implemented in hardware (i.e., circuitry) or firmware of the client device 305, the access provider 325, the identity provider 360, and the service provider 345 (e.g., as circuitry within the one or more computer processors 310, 330, 365, 350). However, other embodiments of the diagram 300 may include modules that are partially or fully implemented in other hardware or firmware, such as hardware or firmware included in one or more other computing devices connected with the network 320, and so forth. Stated another way, the overall functionality of the one or more modules may be distributed among other devices of the diagram 300.

As shown, the memory 335 of the access provider 325 comprises an assurance module 340, the memory 355 of the service provider 345 comprises a services module 356, and the memory 370 of the identity provider 360 comprises an identity services module 372.

The assurance module 340 generally communicates with the client device 305, the identity provider 360, and the service provider 345 to establish a secure connection with the service provider 345 to provide one or more network-based services for network traffic with the client device 305. The services module 356 generally provides the one or more network-based services for the network traffic. In some embodiments, the services module 356 provides cloud-based service(s) using distributed and/or scalable computing resources that may be provisioned and/or released on-demand.

The one or more network-based services may be provided in any suitable form. In some embodiments, the one or more network-based services comprise security service(s) of any suitable type(s), such as a firewall, a content filter, anti-malware, protection against known malicious sites, and so forth. In some embodiments, the services module 356 may be implemented as a secure internet or web gateway.

The identity services module 372 generally operates to create, maintain, and/or manage identity information for different users. The identity services module 372 may further provide authentication services for the different users. In some embodiments, the identity services module 372 issues a credential 375 used for authenticating a user. The credential 375 may be implemented in any suitable form, such as a secure token that is unique for a particular session with the user. In some embodiments, the secure token comprises (i) a value provided by the identity provider 360, (ii) an identifier of the identity provider 360, and/or (iii) a value provided by the service provider 345. For example, the secure token may be implemented as a concatenation of (i), (ii), and (iii).

Each user is associated with one or more identities 316. Each of the identities 316 generally include characteristics of the identity 235 described above with respect to FIG. 2. In some embodiments, the user configures one or more policies 380 (e.g., corresponding to the one or more identities 316) that are stored by the identity provider 360. Thus, the one or more policies 380 may be predefined relative to when the client device 305 roams to the access provider 325. Each policy 380 specifies one or more network-based services (or capabilities or features) to be applied when the corresponding identity 316 is selected. Some example techniques for selecting an identity 316 are discussed above with respect to FIG. 2. In some embodiments, the policies 380 may specify a particular service provider 345 to use, may specify preferences (e.g., an order) for selecting the service provider 345 from a number of service providers, and so forth. Each policy 380 may be stored by the identity provider 360 in any suitable format, such as YAML, XML, and so forth.

Thus, the identity provider 360 may be capable of offering cloud-based services (e.g., indicating which cloud-based services are available) when the user roams to a capable access provider 325. For example, the identity provider 360 may have a revenue sharing agreement with one or more service providers 345. In some embodiments, the cloud-based services offered by the identity provider 360 may include multiple levels or tiers of security that are selectable by the user. In this way, a user may customize the security service(s) that applied to the client device's connection with the access network provider, and may validate that those customized security service(s) are in fact being provided by the service provider(s) 345.

Each of the identities 316 associated with the user may be associated with a set of one or more cloud-based services. The identities 316 associated with the user may be sorted or prioritized based on user preferences. Further, the cloud-based security services may be selected and/or purchased directly by the user, or may be offered directly by the access provider 325.

According to various embodiments described herein, the assurance module 340 operates, either independently or in combination with the services module 356, to communicate with the client device 305 to enable the client device 305 to determine whether the one or more network-based services are in fact being provided by the service provider 345. In some embodiments, the client device 305 may ignore or discard received network traffic when the client device 305 determines that the one or more network-based services are not being provided by the service provider 345.

In some embodiments, packets of network traffic that are transmitted from the service provider 345 include an assurance value 390. The assurance value 390 may be based on one or more tokens that are assigned to, and/or generated by, various components of the diagram 300.

In some embodiments, the assurance value 390 is a first token that is generated by the identity provider 360, and transmitted to both the service provider 345 and the client device 305. The service provider 345 may embed the first token into the header of the packets, and the client device 305 may check the received packets for the presence of the first token.

In some embodiments, the assurance value 390 is based on the first token, and is further based on a second token that is generated by (and/or assigned to) the service provider 345, and a third token that is generated by (and/or assigned to) the client device 305. For example, the client device 305 may include the third token in packets transmitted to the service provider 345, so that the service provider 345 learns the third token. In some embodiments, the client device 305 stores a plurality of values for the assurance value 390, and may further store a plurality of indices corresponding to the plurality of values.

In some embodiments, the services module 356 comprises a predefined function, and applies the first token, the second token, and the third token to the predefined function to generate a result. The predefined function may include any suitable logical and/or arithmetic functions. In one non-limiting example, the predefined function is a linear function represented as:

$$f(x)=mx+c \quad (1)$$

where m represents the first token, x represents the second token, and c represents the third token. Other functions are also contemplated, which may provide greater robustness against real-time reverse engineering and/or other benefits. In some embodiments, the result of the predefined function as calculated by the services module 356 is the assurance value 390 transmitted from the service provider 345 to the client device 305. In some embodiments, the client device 305 receives and learns the second token, and also comprises the predefined function. The client device 305 may apply the first token, the second token, and the third token to the predefined function to generate a result, and compares the result with the assurance value 390 to determine whether the one or more network-based services are in fact being provided by the service provider 345.

In some embodiments, packets of the network traffic from the client device 305 include a value that is used by the service provider 345 to generate the assurance value 390. In some embodiments, the value is included in any of the in-band (in-situ) operations, administration, and maintenance (OAM) header, in-band network telemetry (INT), cookies, or other metadata headers of the packets.

In some embodiments, the services module 356 stores a plurality of values for the assurance value 390 (as well as indices), and the value received from the client device 305 is an index value that is used by the services module 356 to look up and return the corresponding assurance value 390. In other embodiments, the value received from the client device 305 is the third token, and the services module 356 applies the third token (with the first token and the second token) to the predefined function to generate and return the assurance value 390. In some embodiments, the services module 356 processes the value received from the client device 305 to determine whether the value is an index (lookup) value or the third token. The client device 305 may use the assurance value 390 received from the services module 356 to determine whether the one or more network-based services are in fact being provided by the service provider 345.

In some embodiments, the client device 305 establishes a separate channel 385 to the service provider 345 (via the access provider 325), which in some cases may be a dedicated assurance channel. The separate channel 385 may have any suitable form, such as a Transmission Control Protocol (TCP) connection, a User Datagram Protocol (UDP) connection, a Quick UDP Internet Connection (QUIC), an Internet Control Message Protocol (ICMP) connection, and so forth.

The client device 305 receives network traffic from the service provider 345 via the original connection, and transmits characterization information 395 of the network traffic via the separate channel 385. The characterization information 395 may have any suitable formatting. For example, the characterization information 395 may include NetFlow statistics or other flow monitoring statistics. In some embodiments, the access provider 325 generates the characterization information 395 and transmits the characterization information 395 to the client device 305. The client device 305 may transmit the characterization information 395 to the service provider 345 via the separate channel 385.

The client device 305 may receive a response from the service provider 345 based on the characterization information 395. In some embodiments, the service module 356 determines whether the flows indicated by the characterization information 395 are present in the local cache table of the service provider 345, which may be cached for at least a predetermined duration. If the flows are present in the local cache table, the response from the service provider 345 is positive. If the flows are not present, however, the response from the service provider 345 is an error message, which may specify information about the missing flow(s).

Figure 4:
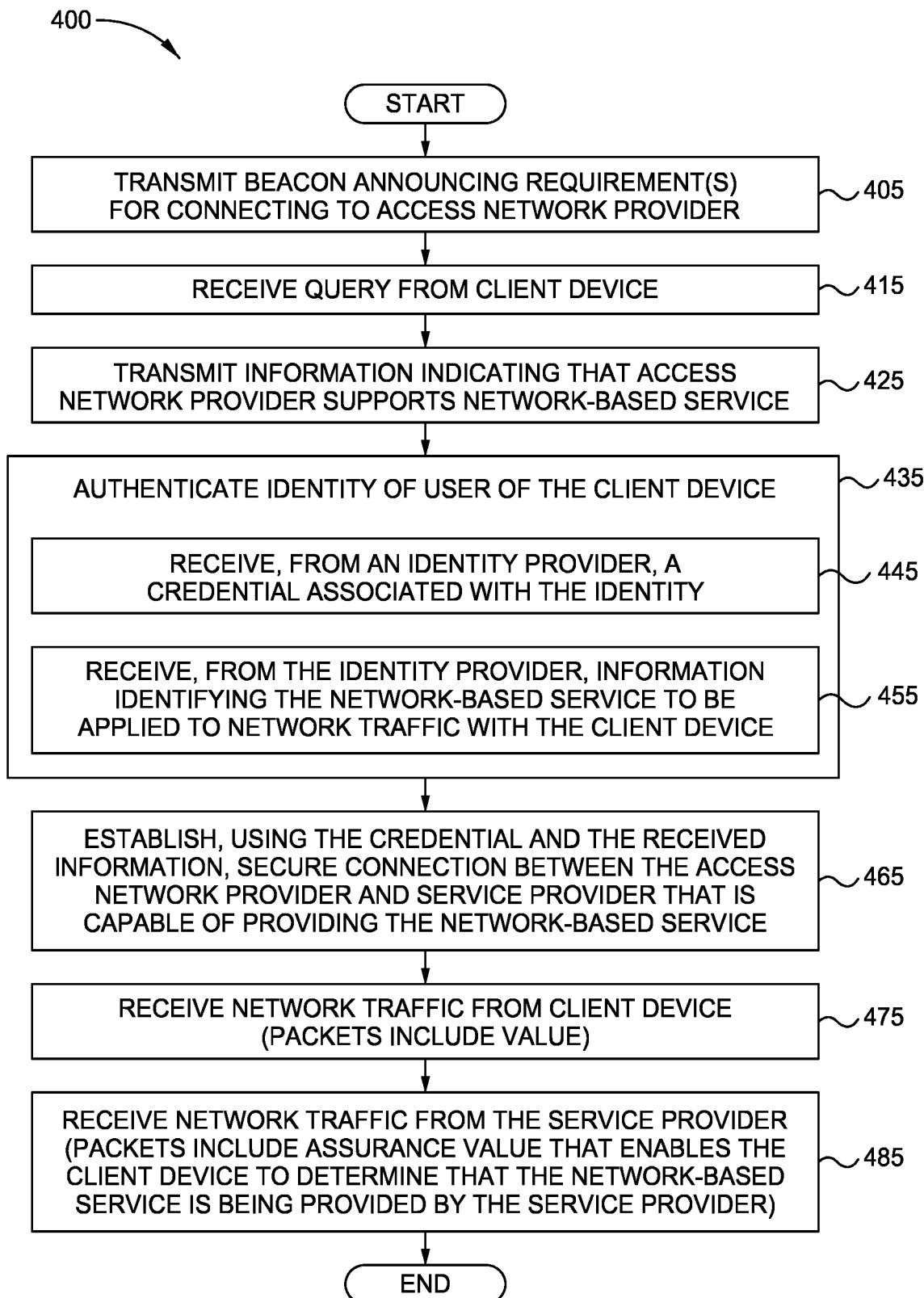
FIG. 4 is a method of providing a network-based service to a client device, according to one or more embodiments.

FIG. 4 is a method 400 of providing a network-based service to a client device, according to one or more embodiments. The method 400 may be performed in conjunction with other embodiments. For example, the method 400 may be performed by the access provider 325 of FIG. 3 when providing a network-based service to the client device 305 of FIG. 3.

The method 400 begins at block 405, where the access network provider transmits a beacon announcing one or more requirements for connecting to the access network provider. For example, the beacon may specify a type of identification (public or private) to be provided by a user.

At block 415, the access network provider receives a query from a client device. In some embodiments, the query complies with Access Network Query Protocol (ANQP). At block 425, the access network provider transmits information indicating that the access network provider supports a network-based service. In some embodiments, the access network provider advertises support for the federation-based network, for automatic grouping to user-defined network (UDN), for the network-based service, etc. using new ANQP elements.

At block 435, the access network provider authenticates an identity of the user of the client device. The access network provider communicates with an identity provider (e.g., the identity provider 360 of FIG. 3), which may be a cloud provider, service provider, device manufacturer, and so forth. The identity provider may use any suitable authentication protocols, such as OAuth, Remote Authentication Dial-In User Service (RADIUS), Security Assertion Markup Language (SAML), and so forth.

In some embodiments, authenticating the identity of the user comprises, at block 445, the access network provider receives, from the identity provider, a credential associated with the identity. The credential may be implemented in any suitable form, such as a secure token that is unique for a particular session with the user. In some embodiments, the secure token comprises a value provided by the identity provider, an identifier of the identity provider, and/or a value provided by the provider of the network-based service. In some embodiments, authenticating the identity of the user further comprises, at block 455, the access network provider receives, from the identity provider, information identifying the network-based service to be applied to network traffic with the client device. In some embodiments, the access network provider receives a RADIUS Access-Accept response from the identity provider.

At block 465, the access network provider establishes, using the credential and the received information, a secure connection between the access network provider and the service provider that is capable of providing the network-based service. In some embodiments, the secure connection comprises a virtual private network (VPN). In some embodiments, establishing the secure connection comprises transmitting (i) information identifying the identity provider and (ii) the credential to the service provider. The access network provider uses the information identifying the network-based service (e.g., the RADIUS attributes) to establish a secure connection to the service provider.

At block 475, the access network provider receives network traffic from the client device. Packets of the network traffic include a value, such as an index value or a client device-generated token, that is transmitted to the service provider to determine an assurance value. At block 485, the access network provider receives network traffic from the service provider. Packets of the network traffic include the assurance value that enables the client device to determine that the network-based service is being provided by the service provider. The method 400 ends following completion of block 485.

Figure 5:
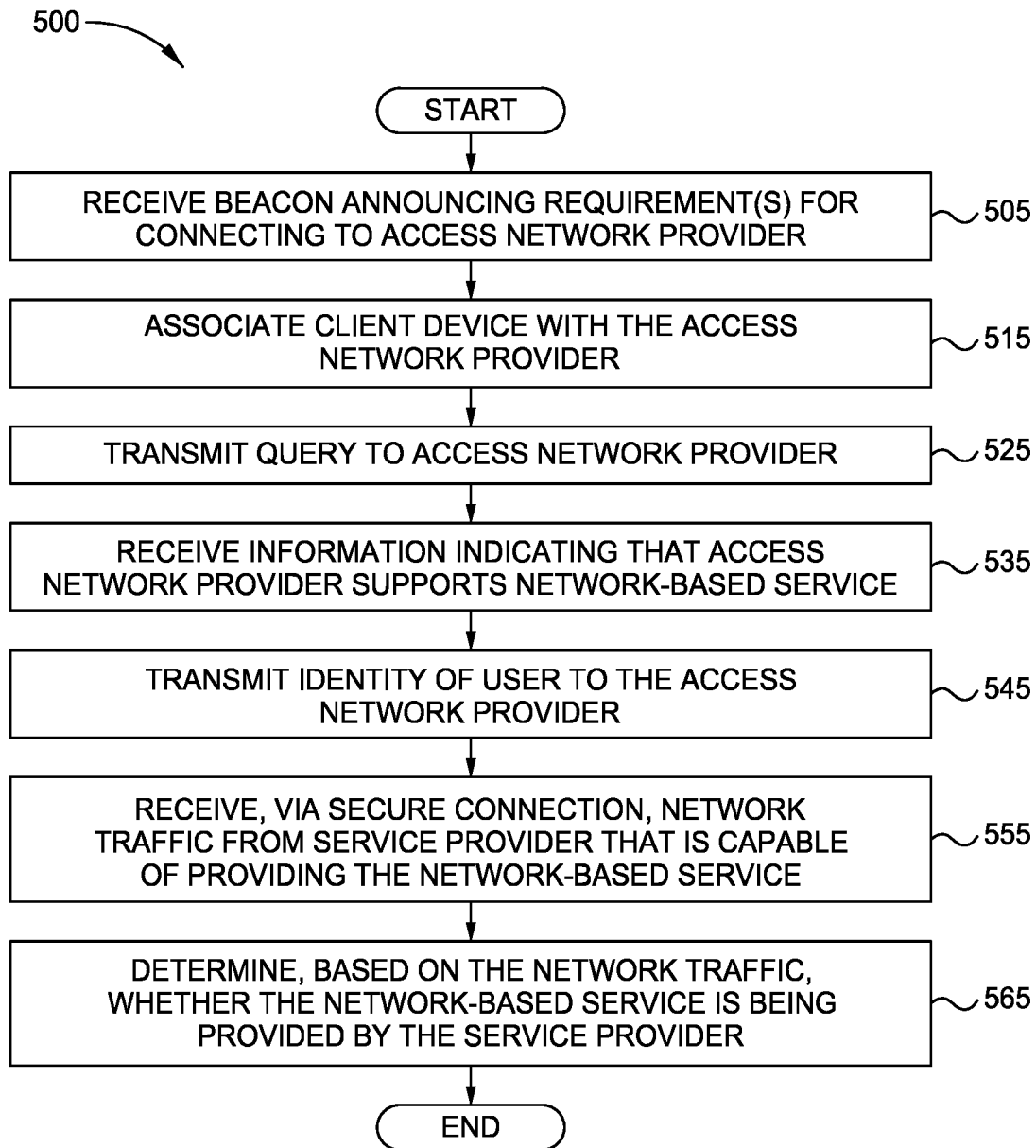
FIG. 5 is a method of providing a network-based service to a client device, according to one or more embodiments.

FIG. 5 is a method 500 of providing a network-based service to a client device, according to one or more embodiments. The method 500 may be performed in conjunction with other embodiments. For example, the method 500 may be performed by the client device 305 of FIG. 3 to determine that a network-based service is being provided by the service provider 345 of FIG. 3.

The method 500 begins at block 505, where the client device receives a beacon announcing one or more requirements for connecting to an access network provider. Block 505 generally corresponds to block 405 of FIG. 4. At block 515, the client device associates with the access network provider. In some embodiments, associating with the access network provider comprises transmitting a query to the access network provider at block 525. Block 525 generally corresponds to block 415 of FIG. 4.

At block 535, the client device receives information indicating that the access network provider supports a network-based service. Block 535 generally corresponds to block 425 of FIG. 4. At block 545, the client device transmits an identity of the user to the access network provider. The identity of the user may be used by the access network provider to authenticate the identity with an identity provider (e.g., at block 435 of FIG. 4).

At block 555, the client device receives, via a secure connection, network traffic from a service provider that is capable of providing the network-based service. At block 565, the client device determines, based on the network traffic, whether the network-based service is being provided by the service provider. The method 500 ends following completion of block 565.

Figure 6:
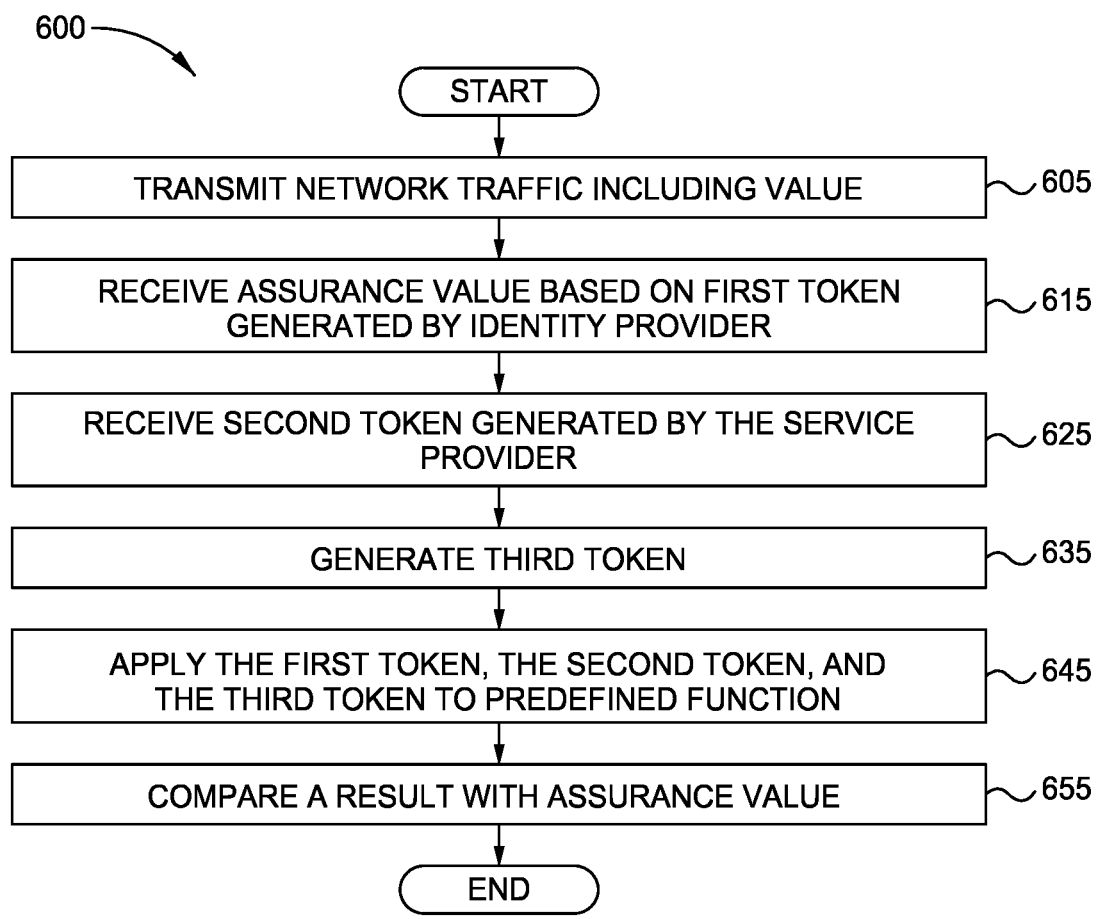
FIG. 6 is a method of determining whether a network-based service is being provided to a client device.

FIG. 6 is a method 600 of determining whether a network-based service is being provided to a client device. In some embodiments, the method 600 is performed as part of block 565 of FIG. 5.

The method 600 begins at block 605, where the client device transmits network traffic including a value, such as an index value or a client device-generated token, that enables a service provider to determine an assurance value. At block 615, the client device receives the assurance value that is based on a first token generated by an identity provider. The client device receives a second token generated by the service provider at block 625, and generates a third token.

At block 645, the client device applies the first token, the second token, and the third token to a predefined function, and at block 655 compares a result of the predefined function with the assurance value. The method 600 ends following completion of block 655.

Figure 7:
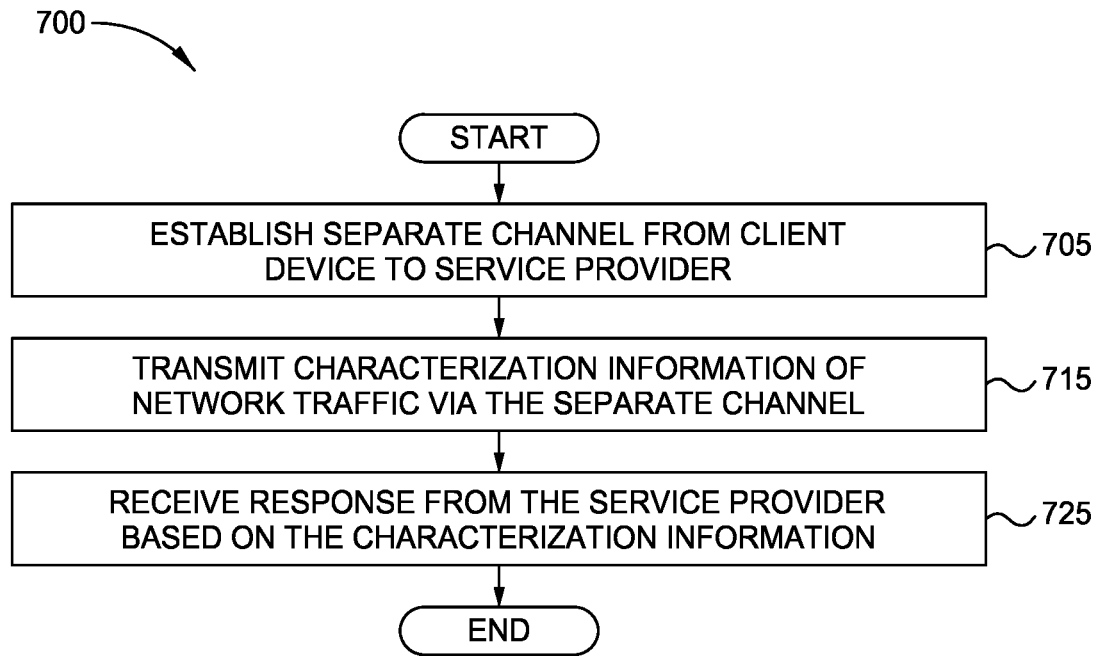
FIG. 7 is a method of determining whether a network-based service is being provided to a client device.

FIG. 7 is a method 700 of determining whether a network-based service is being provided to a client device. In some embodiments, the method 700 is performed as part of block 565 of FIG. 5.

The method 700 begins at block 705, where the client device establishes a separate channel to a service provider via the access network provider. In some embodiments, the separate channel may operate as a dedicated assurance channel. At block 715, characterization information of the network traffic is transmitted to the service provider via the separate channel. In some embodiments, the characterization information comprises NetFlow statistics or other flow monitoring statistics.

At block 725, the client device receives a response from the service provider based on the characterization information. In some embodiments, the service provider determines whether the flows indicated by the characterization information are present in the local cache table of the service provider. If the flows are present, the response from the service provider is positive, confirming that the network-based service is being provided to network traffic with the client device. If the flows are not present, the response from the service provider may be an error message, which may specify information about the missing flow(s). The method 700 ends following completion of block 725.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   authenticating an identity of a user of a client device after the client device is associated with an access network provider separate from the client device, wherein authenticating the identity of the user comprises:
      receiving, by the access network provider and from an identity provider separate from the client device and the access network provider, a credential associated with the identity; and
      receiving, from the identity provider, information identifying a network-based service to be applied to network traffic with the client device;
   establishing, using the credential and the received information, a secure connection between the access network provider and a service provider that is capable of providing the network-based service, wherein the access network provider is separate from the service provider;

receiving, at the access network provider and over the secure connection, network traffic from the service provider, wherein packets of the network traffic include assurance information that enables the client device to determine that the network-based service is being provided by the service provider, and wherein the assurance information is determined using a function based on a first token communicated by the identity provider to the service provider and the client device; and communicating, by the access network provider, the network traffic to the client device, wherein characterization information of the network traffic is communicated from the client device to the service provider through a channel (i) between the client device and the service provider and (ii) separate from the secure connection, and wherein the service provider communicates to the client device a response indicating whether the characterization information is present in a cache table of the service provider.

2. The method of claim 1, wherein the network-based service comprises a security service that is specified in a security policy for the identity, wherein the security policy is stored by the identity provider.

3. The method of claim 1, wherein the first token is generated by the identity provider and wherein the first token is transmitted to the client device via the access network provider.

4. The method of claim 3, wherein the assurance value is the first token.

5. The method of claim 3, wherein the assurance value is further based on:
a second token that is generated by the service provider; and
a third token that is generated by the client device.

6. The method of claim 5, wherein the assurance value is a result of the first token, the second token, and the third token applied to a predefined function.

7. The method of claim 1, further comprising:
receiving network traffic from the client device, wherein packets of the network traffic include a second value, wherein the assurance value is based on the second value.

8. A network device comprising:
one or more computer processors configured to perform an operation comprising:
authenticating an identity of a user of a client device after the client device is associated with an access network provider separate from the client device, wherein authenticating the identity of the user comprises:
receiving, by the access network provider and from an identity provider separate from the client device and the access network provider, a credential associated with the identity; and
receiving, from the identity provider, information identifying a network-based service to be applied to network traffic with the client device;
establishing, using the credential and the received information, a secure connection between the access network provider and a service provider that is capable of providing the network-based service, wherein the access network provider is separate from the service provider; and
receiving, at the access network provider and over the secure connection, network traffic from the service provider, wherein packets of the network traffic include assurance information that enables the client device to determine that the network-based service is being provided by the service provider, wherein the assurance information is determined using a function based on a first token communicated by the identity provider to the service provider and the client device, wherein characterization information of the network traffic is communicated from the client device to the service provider through a channel (i) between the client device and the service provider and (ii) separate from the secure connection, and wherein the service provider communicates to the client device a response indicating whether the characterization information is present in a cache table of the service provider.

9. The network device of claim 8, wherein the network-based service comprises a security service that is specified in a security policy for the identity, wherein the security policy is stored by the identity provider.

10. The network device of claim 8, wherein the first token is generated by the identity provider, and wherein the first token is transmitted to the client device via the access network provider.

11. The network device of claim 10, wherein the assurance value is the first token.

12. The network device of claim 10, wherein the assurance value is further based on:
a second token that is generated by the service provider; and
a third token that is generated by the client device.

13. The network device of claim 12, wherein the assurance value is a result of the first token, the second token, and the third token applied to a predefined function.

14. The network device of claim 8, the operation further comprising:
receiving network traffic from the client device, wherein packets of the network traffic include a second value, wherein the assurance value is based on the second value.

15. A method comprising:
associating a client device with an access network provider separate from the client device, wherein associating the client device comprises transmitting an identity of a user of the client device to the access network provider, wherein the identity enables the access network provider to receive, from an identity provider separate from the client device and the access network provider, (i) a credential associated with the identity and (ii) information identifying a network-based service to be applied to network traffic with the client device;
receiving, by the access network provider and from a service provider separate from the access network provider and that is capable of providing the network-based service, network traffic via a secure connection between the service provider and the access network provider, wherein the secure connection is established using the credential and the received information; and
determining, based on assurance information embedded by the service provider in headers of packets of the network traffic, whether the network-based service is being provided by the service provider, wherein the assurance information is determined using a function based on a first token communicated by the identity provider to the service provider and the client device;
establishing a channel from the client device to the service provider and separate from the secure connection;
transmitting characterization information of the network traffic from the client device to the service provider via the channel; and receiving, at the client device, a response from the service provider indicating whether the characterization information is present in a cache table of the service provider.

16. The method of claim 15, wherein the assurance information is generated by the identity provider, and wherein the first token is transmitted to the client device via the access network provider.

17. The method of claim 16, wherein the assurance information is the first token, and wherein determining whether the network-based service is being provided by the service provider further comprises:
   comparing the assurance information received in the network traffic with the first token received by the client device.

18. The method of claim 16, further comprising:
   receiving a second token that is generated by the service provider;
   generating a third token;
   applying, to a predefined function, the first token, a second token generated by the service provider, and a third token generated by the client device; and
   comparing a result of the predefined function to the assurance information.

19. The method of claim 16, further comprising:
   transmitting, from the client device, network traffic including a second value, wherein the assurance information is generated based on the second value.

* * * * *